(12) United States Patent
Shoham

(10) Patent No.: US 10,627,293 B2
(45) Date of Patent: Apr. 21, 2020

(54) SELF-AMPLIFYING SENSOR PAIR

(71) Applicant: TODOS TECHNOLOGIES LTD., Airport City (IL)

(72) Inventor: Yoav Shoham, Caesarea (IL)

(73) Assignee: Todos Technologies Ltd., Haifa (IL)

( * ) Notice: Subject to any disclaimer, the term of this patent is extended or adjusted under 35 U.S.C. 154(b) by 324 days.

(21) Appl. No.: 15/316,182

(22) PCT Filed: May 7, 2015

(86) PCT No.: PCT/IB2015/053337
§ 371 (c)(1),
(2) Date: Dec. 5, 2016

(87) PCT Pub. No.: WO2015/186011
PCT Pub. Date: Dec. 10, 2015

(65) Prior Publication Data
US 2018/0202865 A1    Jul. 19, 2018

Related U.S. Application Data

(60) Provisional application No. 62/006,898, filed on Jun. 3, 2014.

(51) Int. Cl.
*G01J 5/24* (2006.01)
*G01J 5/20* (2006.01)
*G01J 5/08* (2006.01)

(52) U.S. Cl.
CPC .............. *G01J 5/24* (2013.01); *G01J 5/0806* (2013.01); *G01J 5/20* (2013.01); *G01J 2005/202* (2013.01)

(58) Field of Classification Search
CPC ........................................ G01J 5/20; G01J 5/24
USPC ...................................................... 250/338.4
See application file for complete search history.

(56) References Cited

U.S. PATENT DOCUMENTS

| | | | | |
|---|---|---|---|---|
| 3,896,311 A * | 7/1975 | Taylor | ...................... | G01J 5/34 250/338.3 |
| 4,377,808 A * | 3/1983 | Kao | ........................ | G08B 13/19 250/DIG. 1 |
| 5,034,608 A * | 7/1991 | Tavrow | ...................... | G01J 5/34 250/338.1 |
| 6,628,162 B2 * | 9/2003 | Kondo | .................... | G05F 3/247 327/540 |
| 2009/0302947 A1 * | 12/2009 | Oishi | .................... | H03D 7/1441 330/254 |
| 2014/0151581 A1 * | 6/2014 | Nemirovsky | ....... | G01N 21/3581 250/504 R |

* cited by examiner

*Primary Examiner* — David P Porta
*Assistant Examiner* — Abra S Fein
(74) *Attorney, Agent, or Firm* — Reches Patents

(57) ABSTRACT

A sensing device includes a pair of infrared sensors comprising respective temperature-sensitive transistors, which are configured to generate respective output signals in response to incident thermal radiation, and which are coupled together in a differential circuit topology that includes at least one differential amplifier that follows the temperature-sensitive transistors, so as to amplify a difference between the respective output signals.

6 Claims, 2 Drawing Sheets

SELF-AMPLIFYING SENSOR PAIR

CROSS-REFERENCE TO RELATED APPLICATION

This application claims the benefit of U.S. Provisional Patent Application 62/006,898, filed Jun. 3, 2014, which is incorporated herein by reference.

FIELD OF THE INVENTION

The present invention relates generally to radiation sensing, and particularly to sensors for detection of thermal infrared (IR) radiation.

BACKGROUND

U.S. Pat. No. 7,489,024, whose disclosure is incorporated herein by reference, describes uncooled infrared sensors based on a micro-machined temperature-sensitive MOS transistor. The sensors can be fabricated using a commercial CMOS process on silicon-on-insulator (SOI) wafers, followed by backside silicon dry etching for each sensor pixel. Sensors produced by the techniques described in this patent are referred to as "thermally-isolated metal oxide semiconductor" (TMOS) sensors.

SUMMARY

Embodiments of the present invention that are described hereinbelow provide improved infrared sensing devices.

There is therefore provided, in accordance with an embodiment of the invention, a sensing device, which includes a pair of infrared sensors including respective temperature-sensitive transistors, which are configured to generate respective output signals in response to incident thermal radiation, and which are coupled together in a differential circuit topology so as to amplify a difference between the respective output signals.

In some embodiments, the transistors are configured as MOSFET devices, including respective source, drain and gate terminals, wherein the source terminals of the transistors are connected together to a current source, which provides a bias current, while the drain terminals are connected to drive respective loads. Typically, the respective output signals at the drain terminals are proportional to a product of a load resistance of the respective loads with respective transconductances of the transistors.

In some embodiments, the drain terminals are coupled to respective inputs of at least one differential amplifier, which generates a final output signal from the device. In a disclosed embodiment, the drain terminals are connected to the respective inputs of a pair of differential amplifiers, whose outputs are fed back respectively to the gate terminals of the transistors. Additionally or alternatively, the outputs of the pair of the differential amplifiers are connected to further respective inputs of a further differential amplifier, which outputs the final output signal from the device.

In a disclosed embodiment, the infrared sensors include thermally-isolated metal oxide semiconductor (TMOS) sensors.

Typically, the device includes a lens, which is configured to focus the thermal radiation from different, respective areas of a field of view onto the sensors.

There is also provided, in accordance with an embodiment of the invention, a method for sensing thermal radiation, which includes providing a pair of infrared sensors including respective temperature-sensitive transistors, which are configured to generate respective output signals in response to incident thermal radiation. The transistors are coupled together in a differential circuit topology so as to amplify a difference between the respective output signals.

The present invention will be more fully understood from the following detailed description of the embodiments thereof, taken together with the drawings in which:

DETAILED DESCRIPTION OF EMBODIMENTS

Low-cost passive IR sensors are used in a variety of applications, such as motion detection in intrusion alarm systems, for example. In this latter application, a pair of IR sensors is typically arranged to receive radiation from different, respective areas within the field of view of the detector. Motion within the field of view will cause a change in the output signal of one of the sensors relative to the other. A detection circuit senses and amplifies the difference between the output signals, and issues an alarm when the difference exceeds a certain threshold. The output signals from the two sensors may, for example, be wired to opposite inputs of a differential amplifier. In such designs, however, it is generally necessary to use a costly, high-quality, low-noise amplifier in order to faithfully amplify the weak signals from the sensors while avoiding false alarms due to noise.

Embodiments of the present invention that are described herein obviate the need for a high-quality amplifier in this sort of passive IR sensor, by taking advantage of the inherent amplification gain of the sensors themselves. The disclosed embodiments are built on temperature-sensitive transistors, such as the TMOS sensors mentioned above. A pair of these sensors is arranged in a differential circuit configuration, so that the transistors not only sense incident thermal radiation, but also provide high-gain amplification of the difference between the output signals of the two sensors. This configuration provides built-in differential amplification while introducing almost no additional noise into the detection circuit. The sensor pair thus outputs a robust signal, of sufficiently high amplitude and low noise so that subsequent amplification stages in the detection circuit can use simpler, low-cost amplifiers.

Figure 1:
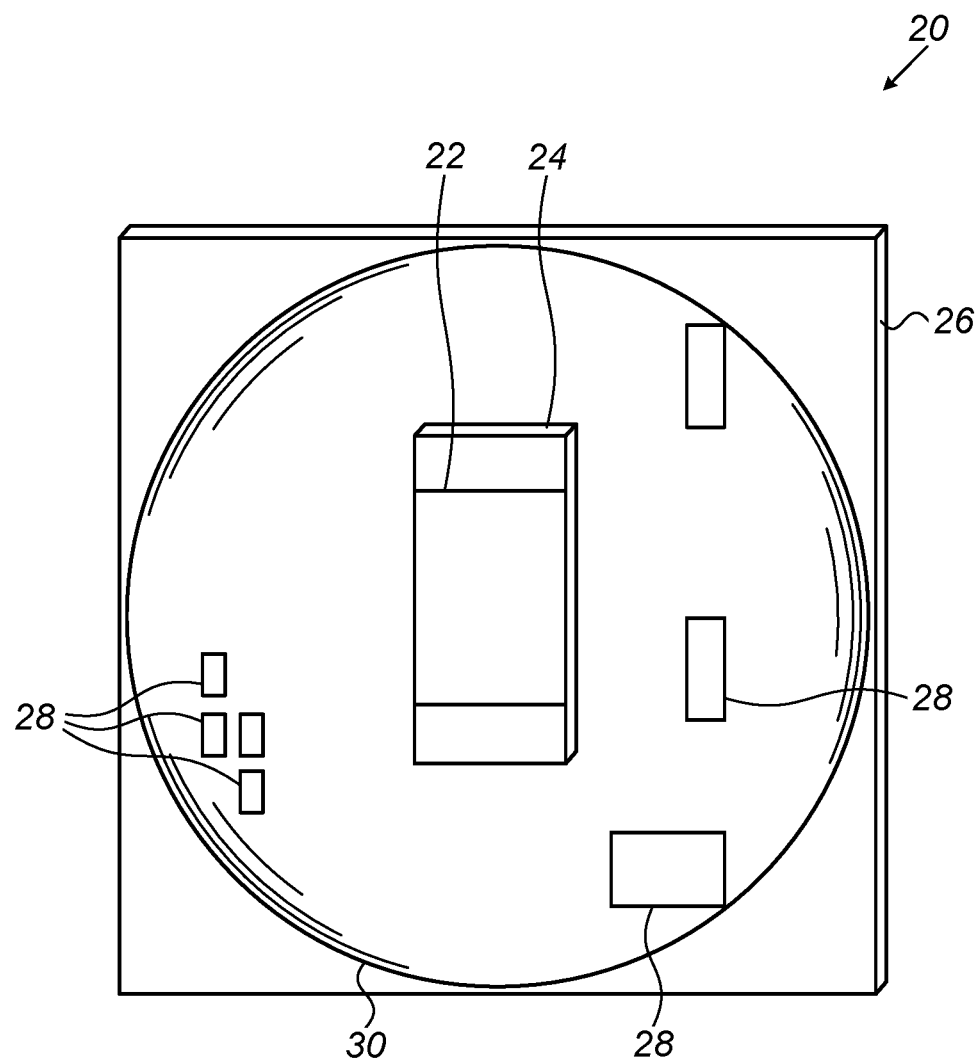
FIG. 1 a schematic, pictorial illustration of a differential passive IR detection device, in accordance with an embodiment of the present invention.

FIG. 1 a schematic, pictorial illustration of a differential passive IR detection device 20, in accordance with an embodiment of the present invention. The device is built around a dual-sensor chip 22, containing a pair of temperature-sensitive transistors, such as TMOS sensors, in an integrated circuit package 24, which is mounted on a printed circuit board 26. The board also includes ancillary components 28, such as biasing and amplification circuits, as well as a DC power supply and other passive components. A wide-angle lens 30, as is known in the art, collects and focus IR radiation from different, respective areas of a field of view onto the two sensors.

Figure 2:
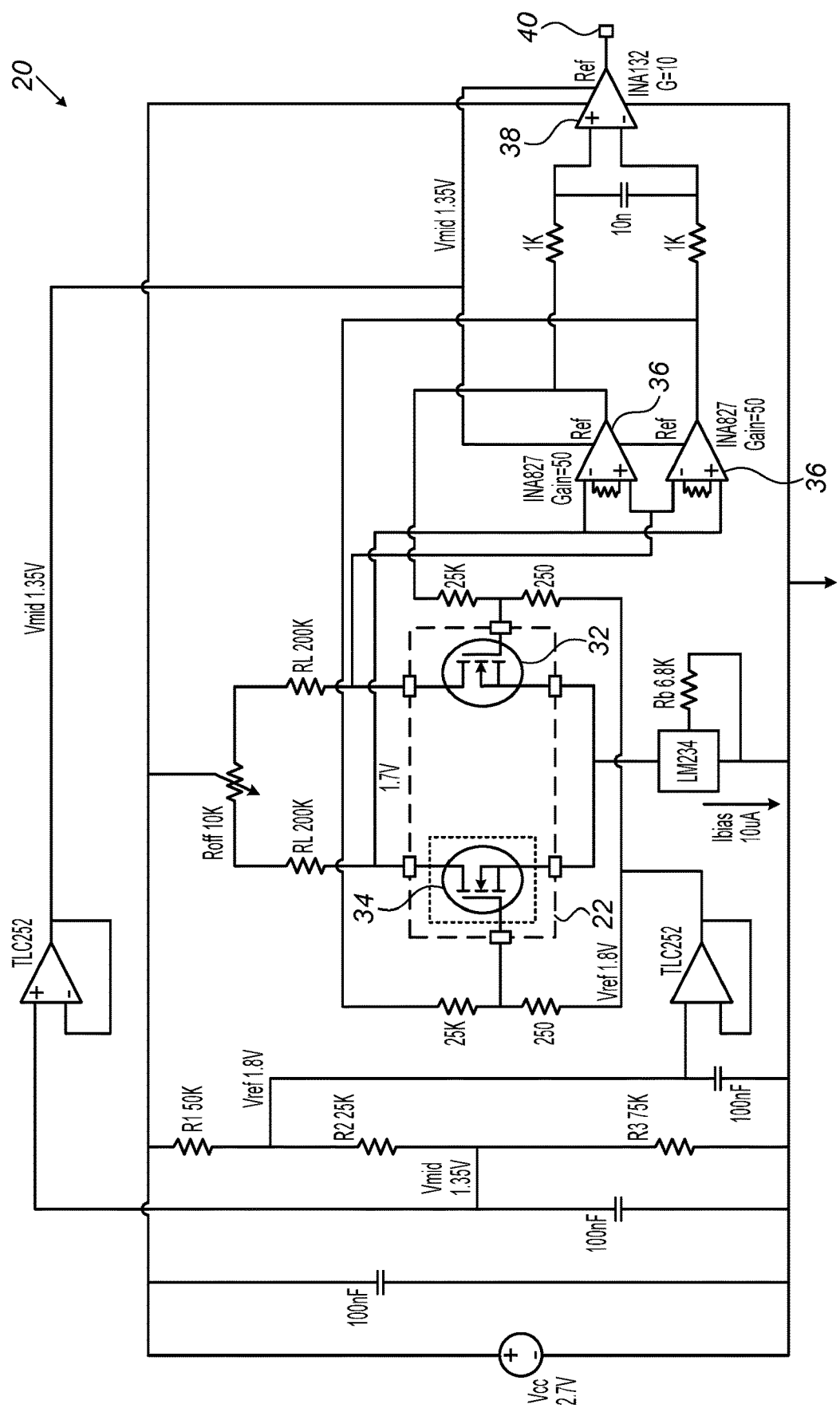
FIG. 2 is a schematic circuit diagram of an IR detection device, in accordance with an embodiment of the present invention.

FIG. 2 is a schematic circuit diagram showing the electronic design of IR detection device 20, in accordance with an embodiment of the present invention. Dual-sensor chip 22 comprises a pair of temperature-sensitive transistors 32 and 34, connected together in a differential configuration. Although transistors 32 and 34 are shown in the figure as N-channel MOSFET devices, the principles of this design may be applied, mutatis mutandis, using temperature-sensitive transistors of other types. A current source (such as a Texas Instruments LM234 device, as shown in the figure) provides a bias current, 10 μA in this example, to the source terminals of transistors 32 and 34. The drains are connected to drive respective loads, marked as RL=200 KΩ.

The pair of transistors 32 and 34 thus functions as a differential amplification stage, with amplification given by the product of the load resistance RL with the transconductances ($g_m$) of the transistors themselves, which in turn depends on the incident thermal energy. The differential output signal of this transistor pair, whose amplitude is proportional to the difference between the thermal inputs received by the two transistors, is input to at least one differential amplifier, which amplifies the signal and generates the final output signal from device 20.

In the example shown in FIG. 2, the differential signals from the pair of transistors 32 and 34 are fed to second and third amplification stages. Specifically, the drains of transistors 32 and 34 are connected to the inputs of a pair of differential amplifiers 36, whose output is fed back to the gate terminals of the transistors. The outputs of differential amplifiers 36 are input to a final differential amplifier 38, which generates the output signal of device 20 at an output terminal 40. In the example shown in the figure, amplifiers 36 and 38 are shown Texas Instruments INA827 and INA 132 devices, respectively, but other, equivalent sorts of devices may alternatively be used, with a smaller or larger number of amplification stages. In the present example, amplifiers 36 and 38 are set to amplify the differential output of the pair of transistors 32 and 34 by a gain G=500, but larger or smaller gain values may be used, depending on application requirements.

As explained above, using the TMOS sensors (or other temperature-sensitive transistors) themselves as the first amplification stage in this manner reduces the cost of the detection device, while at the same time improving the signal/noise ratio and reducing power consumption. Although the embodiment shown in FIGS. 1 and 2 uses discrete circuit components alongside sensor chip 22 on printed circuit board 26, the advantages of the present design can be enhanced still further by incorporating the readout and biasing circuit components in the same chip as the sensors.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

I claim:

1. A sensing device, comprising a pair of infrared sensors comprising respective temperature-sensitive transistors, which are configured to generate respective output signals in response to incident thermal radiation, and which are coupled together in a differential circuit topology so as to amplify a difference between the respective output signals;
    wherein the temperature-sensitive transistors are configured as MOSFET devices, comprising respective source, drain and gate terminals, wherein the source terminals of the temperature-sensitive transistors are connected together to a current source, which provides a bias current, while the drain terminals of the temperature-sensitive transistors are connected to drive respective loads;
    wherein the drain terminals are coupled to respective inputs of at least one differential amplifier, which generates a final output signal from the device;
    wherein the temperature-sensitive transistors comprise a first temperature-sensitive transistor and a second temperature-sensitive transistor;
    wherein the pair of differential amplifiers comprise a first differential amplifier and a second differential amplifier;
    wherein a drain terminal of the first transistor is coupled to an inverting input of the first differential amplifier and to a non-inverting input of the second differential amplifier;
    wherein a drain terminal of the second transistor is coupled to a non-inverting input of the first differential amplifier and to an inverting input of the second differential amplifier;
    wherein an output terminal of the first differential amplifier is coupled, via a first resistor-based voltage divider, to a gate terminal of the first temperature-sensitive transistor;
    wherein an output terminal of the second differential amplifier is coupled, via a second resistor-based voltage divider, to a gate terminal of the second temperature-sensitive transistor; and
    wherein the device comprises comprising a reference voltage amplifier that is configures to provide a same reference voltage to the first differential amplifier, the second differential amplifier and the third differential amplifier.

2. The device according to claim 1, wherein the respective output signals at the drain terminals are proportional to a product of a load resistance of the respective loads with respective transconductances of the temperature-sensitive transistors.

3. The device according to claim 1, wherein the drain terminals are connected to the respective inputs of a pair of differential amplifiers, whose outputs are fed back respectively to the gate terminals of the temperature-sensitive transistors.

4. The device according to claim 3, wherein the outputs of the pair of the differential amplifiers are connected to further respective inputs of a further differential amplifier, which outputs the final output signal from the device.

5. The device according to claim 1, wherein the infrared sensors comprise thermally-isolated metal oxide semiconductor (TMOS) sensors.

6. The device according to claim 1, and comprising a lens, which is configured to focus the thermal radiation from different, respective areas of a field of view onto the sensors.

* * * * *